C. SCHURCH.
THRESHING MACHINE.
APPLICATION FILED AUG. 7, 1912.

1,082,913.

Patented Dec. 30, 1913.

2 SHEETS—SHEET 2.

Witnesses
J. Milton Jester
B. P. Stephens

Inventor
C. Schurch

By
C. L. Parker
Attorney

UNITED STATES PATENT OFFICE.

CHRIS SCHURCH, OF CHATTANOOGA, TENNESSEE.

THRESHING-MACHINE.

1,082,913. Specification of Letters Patent. Patented Dec. 30, 1913.

Application filed August 7, 1912. Serial No. 713,786.

*To all whom it may concern:*

Be it known that I, CHRIS SCHURCH, a citizen of the United States, residing at Chattanooga, in the county of Hamilton and State of Tennessee, have invented certain new and useful Improvements in Threshing-Machines, of which the following is a specification.

The present invention relates to threshing machines and has particular reference to a machine of this character adapted to receive therein soja beans or the like on the stalks to remove the beans from the hulls and discharge the stalks and hulls at a point remote from the deposit of the beans.

An important object of this invention is to provide a machine of the above mentioned character, which will properly hull the pods which are attached to the stalks, thus dispensing with the necessity of first taking the beans from the stalks.

A further object of the invention is to provide a machine of the above mentioned character, which is efficient and thorough in operation, strong, durable, and simple in construction.

Other objects and advantages of the invention will be apparent during the course of the following description.

Figure 1:
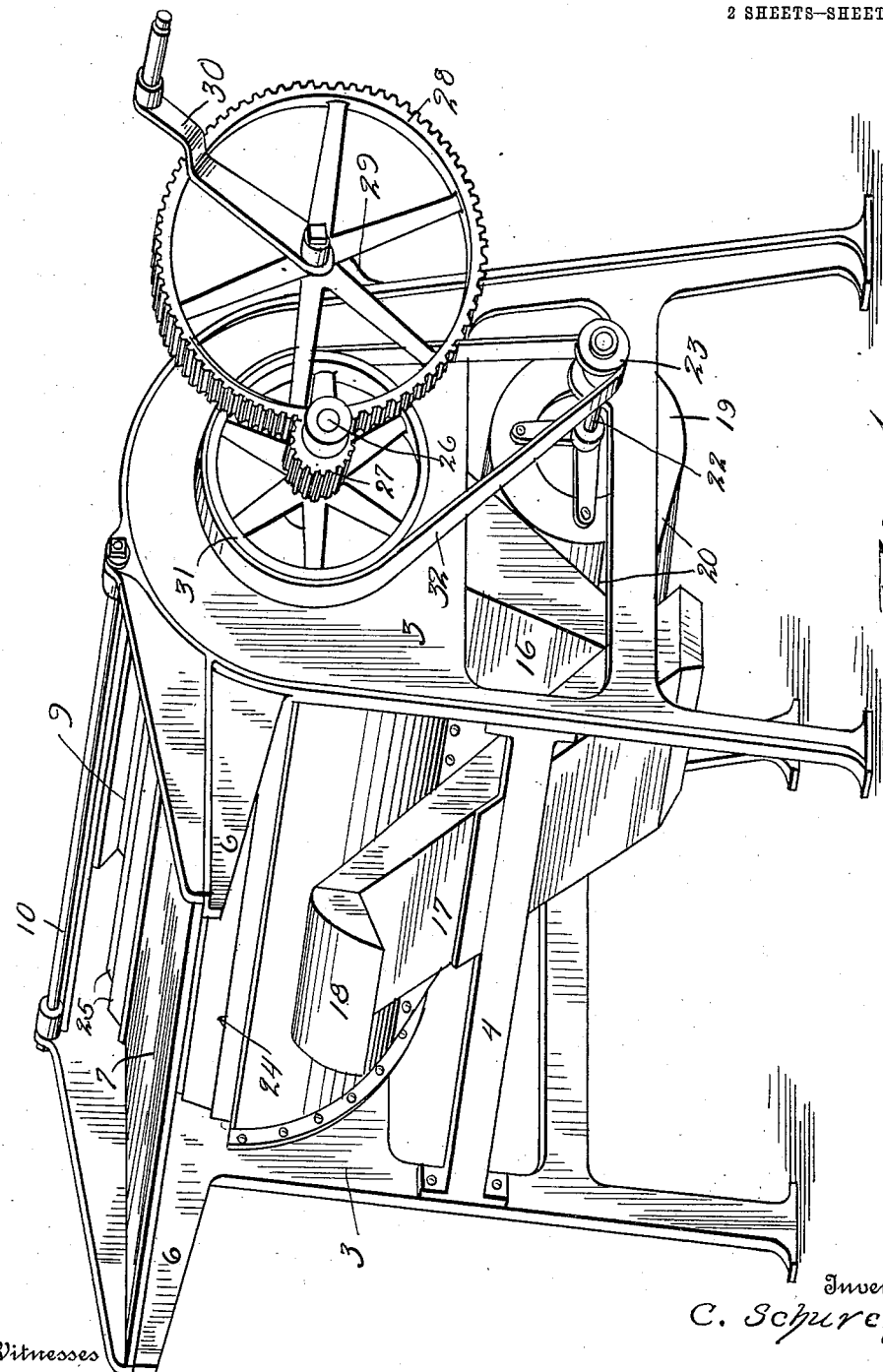
Figure 2:
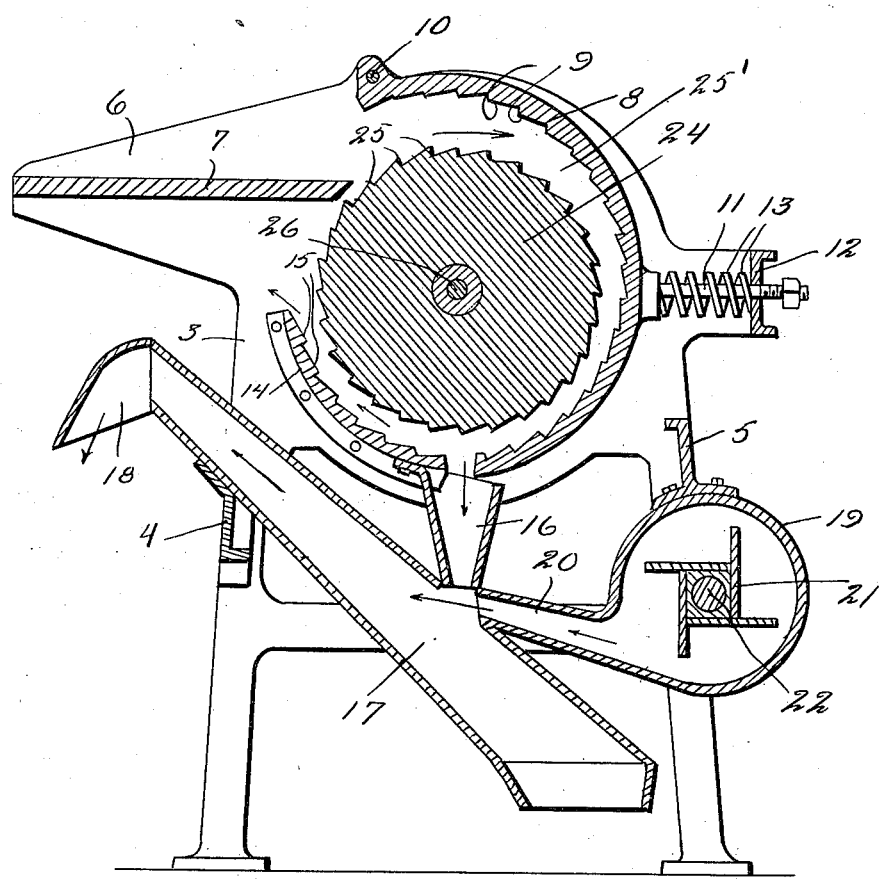

In the accompanying drawings forming a part of this specification and in which like numerals are employed to designate like parts throughout the same, Figure 1 is a perspective view of the machine, and, Fig. 2 is a central vertical transverse sectional view through the same.

In the drawings wherein for the purpose of illustration, I have shown a preferred embodiment of my invention, the numeral 3 designates upstanding end pieces, which are suitably connected by transverse horizontal bars 4 and 5. The end pieces 3 carry forward extensions 6, between which is mounted a horizontal feed table 7. Disposed between the end pieces 3 is a swinging bed 8, which is curved in cross-section and provided with ratchet teeth 9, pitched or faced forwardly, as shown. The swinging bed 8 is pivotally supported by a rod 10 which passes through the upper portions of the end pieces 3. Connected with the swinging bed 8 and preferably midway the ends thereof is a rod 11, which is mounted to reciprocate within an opening formed through a rear bracket 12. Surrounding the rod 11 is a compressible coil spring 13 tending to move the bed 8 inwardly and yieldingly opposing its outward swinging movement. Disposed near and spaced from the lower end of the curved bed 8 is a stationary bed 14, which is rigidly attached to the end pieces 3 and is provided with ratchet teeth 15, extending in the same direction with the teeth 9, as shown. The stationary bed 14 is also curved in vertical cross-section, as shown. Attached to the stationary bed 14 is a bean or grain chute 16, discharging into a vertically inclined main chute 17, having its upper and lower ends open, as shown. The main chute 17 is preferably provided at its upper end with a downwardly extending mouth 18, as shown. Suitably connected with the bar 5 is a casing 19 of a rotatable blower mechanism. Connected with this casing is a discharge pipe 20, which leads into the main chute 17 adjacent the lower end of the grain chute 16, as shown. Rotatably mounted within the casing 19 is a fan 21, attached to a shaft 22, carrying a pulley 23.

The numeral 24 designates a drum or cylinder, provided upon its periphery with ratchet teeth 25 pitched or faced rearwardly in an opposite direction to the teeth 9 and 15, as shown. Attention is called to the fact that this rotatable drum is disposed eccentrically with relation to the bed 8, for providing a space 25' therebetween, which gradually decreases in width toward its lower end. The drum 24 is rotated in the direction of the arrow. This drum is rigidly mounted upon a shaft 26, carrying a pinion 27, which is driven by a gear wheel 28. This gear wheel is supported by a fixed bracket 29. The gear wheel is turned by a crank or handle 30. Rigidly connected with the shaft 26 is a large pulley 31, engaged by a belt 32, which extends downwardly to engage the small pulley 23, as shown.

The operation of the machine is as follows:—The beans on the stalk are placed upon the feeding table 7 and preferably extend longitudinally of the same. The stalks carrying the beans are moved into engagement with the rotating drum 24, which pulls them into the space 25. The teeth 9 of the bed 8 tend to retard the travel of the stalks, whereby the drum 24 imparts a backward rotary movement to the same, which is very efficient in hulling the pods to remove the beans. The bed 8 is free to yield to prevent the machine from being choked and to aid in the proper hulling of the pods. Material passes downwardly through the opening 25; the beans dropping through the chute 16 into the main chute 17 and passing through the lower end of said main chute, while the stalks carrying the hulled pods are discharged at the upper end of the stationary bed 14. Any fine particles of trash or portions of the stalks or hulls which descend with the beans, are separated from the same by the air blast discharging through the pipe 20, whereby such trash is carried upwardly through the main chute 17 and finally discharged through the mouth 18. Particular attention is called to the yielding means for opposing the outward movement of the bed 8 and the eccentric arrangement of the drum 24 with relation to the bed, as these points are considered very important features of the invention, as by their employment alone, can the machine be satisfactorily operated.

It is to be understood that the form of my invention herewith shown and described is to be taken as a preferred example of the same, and that certain changes in the shape, size, and arrangement of parts may be resorted to without departing from the spirit of the invention or the scope of the subjoined claims.

Having thus described my invention, I claim:—

1. In a machine for threshing soja beans or the like while on the stalks, the combination with a supporting structure, of a rotatable drum mounted thereon and provided upon its periphery with teeth all of which face in the same direction, a feed table disposed near and upon one side of the toothed drum, a single rigid upstanding curved swinging threshing bed surrounding approximately one-half of the toothed drum and provided upon its inner concave surface with teeth all of which extend in the same direction and are oppositely faced with relation to the first named teeth, means pivotally connecting the extreme upper end only of the single rigid curved threshing bed plate with the supporting structure in such a manner that the same is eccentrically arranged with relation to the toothed drum to provide a space therebetween which gradually decreases in width downwardly, yielding means connected with the single rigid curved bed substantially equi-distantly between its ends to oppose the outward movement thereof, a stationary curved final threshing bed provided upon its inner concave surface with the teeth all of which extend in the same direction and are faced in the opposite direction to the teeth of the drum and disposed below and near the drum in concentric relation thereto with its lower end spaced from the lower end of the swinging threshing bed to provide a threshed bean discharge opening and its open end spaced from the feed table to provide a stalk discharge opening, and means to rotate the drum.

2. In a machine of the character described, the combination with a supporting structure, of a rotatable drum mounted thereon and provided with teeth, a curved swinging threshing bed disposed upon one side of the rotatable drum and provided with teeth, a feed table disposed upon the opposite side thereof, yielding means to oppose the movement of the curved threshing bed away from the rotatable drum, and a relatively stationary threshing bed disposed upon the same side of the rotatable drum with the feed table and having its lower end spaced from the lower end of the swinging threshing bed to provide a threshed bean discharge opening and its open end spaced from the feed table to provide a stalk discharge opening.

In testimony whereof I affix my signature in presence of two witnesses.

CHRIS SCHURCH.

Witnesses:
PAUL CAMPBELL,
C. S. COFFEY.

---

Copies of this patent may be obtained for five cents each, by addressing the "Commissioner of Patents, Washington, D. C."